United States Patent [19]
Wright et al.

[11] Patent Number: 4,732,447
[45] Date of Patent: Mar. 22, 1988

[54] HOMODYNE OPTICAL COHERENT RECEIVER FOR DIGITAL OPTICAL SIGNALS

[75] Inventors: Stephen Wright, London; Anthony W. Davis, Harlow, both of United Kingdom

[73] Assignee: STC PLC, London, England

[21] Appl. No.: 842,105

[22] Filed: Mar. 20, 1986

[30] Foreign Application Priority Data

Mar. 21, 1985 [GB] United Kingdom ............... 8507342

[51] Int. Cl.⁴ .................................................... G02B 6/28
[52] U.S. Cl. ............................. 350/96.16; 455/615; 455/619
[58] Field of Search ............... 350/96.16; 450/615, 450/617, 619

[56] References Cited

U.S. PATENT DOCUMENTS

| | | | |
|---|---|---|---|
| 3,939,341 | 2/1976 | Graves | 455/619 |
| 3,970,838 | 7/1976 | Goodwin et al. | 455/619 |
| 4,044,247 | 8/1977 | Brown, Jr. | 455/619 |
| 4,063,084 | 12/1977 | Goodwin et al. | 455/619 X |
| 4,652,076 | 3/1987 | Unger | 350/96.12 |

FOREIGN PATENT DOCUMENTS 0130950  7/1985  Japan ................... 455/619

*Primary Examiner*—Gene Wan
*Assistant Examiner*—James C. Lee
*Attorney, Agent, or Firm*—Lee, Smith & Zickert

[57] ABSTRACT

A receiver for modulated optical signals including a multiport optical fibre coupler arrangement (10) to one input port of which the modulated optical signals are applied and to another input port of which a local oscillator optical signal of substantially the same optical frequency as the modulated optical signal is applied whereby the output ports of the coupler give separate output signals that are differentially related to the optical frequency phase difference between the modulated input signal and the local oscillator signal, means for individually demodulating (12a–12c) the output signals and means for summing the demodulated output signals.

4 Claims, 5 Drawing Figures

HOMODYNE OPTICAL COHERENT RECEIVER FOR DIGITAL OPTICAL SIGNALS

BACKGROUND OF THE INVENTION

This invention relates to homodyne optical coherent receivers which are phase insensitive.

Coherent optical systems using an optical local oscillator (OLO) at the receiver can give receiver sensitivity approaching the quantum limit. The actual sensitivity depends upon the modulation format and the receiver type. A heterodyne receiver, in which the signal and OLO are set to have a constant difference frequency (IF), offers 3 dB worse sensitivity than a homodyne receiver with the same modulation format. A heterodyne receiver requires that the LO and signal are synchronized in frequency but not in phase: all possible relative phases are explored over each period of the IF. The receiver needs sufficient bandwidth to deal with the IF with modulation sidebands on each side. For wideband data signals high IF frequencies are required (e.g. approaching 1 GHz for 565 Mbit/s), and so very wideband special receivers are required. On the other hand, homodyne receivers offer higher sensitivity, and provide the data signal at baseband. Consequently, receivers already developed for direct detection systems can be used. These would generally have lower noise than the equivalent heterodyne receiver; in coherent operation, shot noise limited operation would then be achieved with lower OLO powers. However, in order to achieve these advantages, the OLO needs to be phase locked to the incoming signal; if the OLO and the signal are in quadrature than their coherent product is zero and no modulation can be detected. Optical phase locking has been demonstrated, but it requires a device with fast phase response in the optical feedback loop. Moreover, transient disturbances to the transmission path could cause large phase deviation, and the phase synchronization could be knocked out of lock. In fact, the phase length of an optical fibre is very sensitive to external perturbation, and hence the growing interest in fibres as sensors of temperature, acoustic vibration etc. An optical phase locked loop will not be a robust and practical system.

SUMMARY OF THE INVENTION

According to the present invention there is provided a receiver for modulated optical signals including a multiport optical fibre coupler arrangement to one input port of which the modulated optical signals are applied to another input port of which a local oscillator optical signal of substantially the same optical frequency as the modulated optical signal is applied whereby the output ports of the coupler give separate output signals that are differentially related to the optical phase difference between the modulated input signal and the local oscillator signal, means for individually demodulating the output signals and means for combining the demodulated output signals.

The term "multiport" as used herein defines a coupler having at least 3 input and 3 output ports with energy being coupled from each input port to all the output ports.

BRIEF DESCRIPTION OF THE DRAWINGS

Embodiments of the invention will now be described with reference to the accompanying drawings, in which.

DESCRIPTION OF THE PREFERRED EMBODIMENTS

Figure 1:
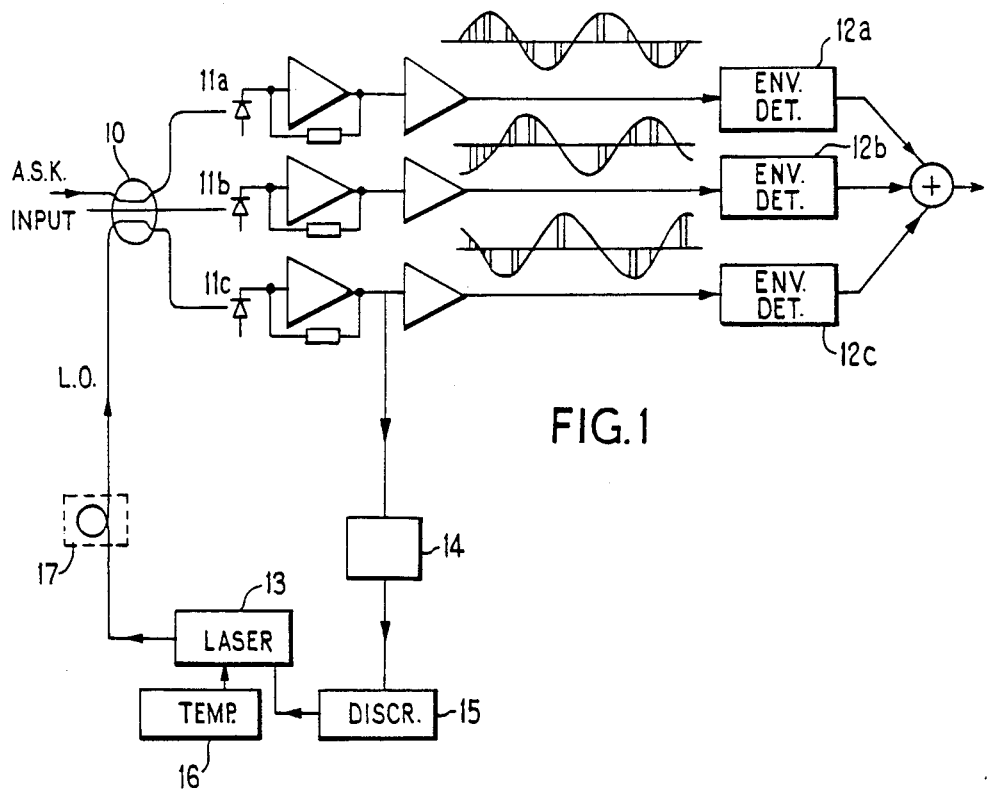
FIG. 1 illustrates an optical receiver for digitally modulated amplitude shift keyed signals employing a 3×3 fibre optic coupler.

In the arrangement shown in FIG. 1 the incoming digitally modulated optical amplitude shift keyed (A.S.K.) signal is coupled into one port of a 3×3 fibre optic coupler 10. An optical local oscillator signal of substantially the same optical frequency as the modulated signal (the difference frequency being defined as f offset) is coupled into a second input port of the coupler. The third input port is not used. A 3×3 coupler is made by twisting and fusing together three single mode optical fibres, and then pulling to adjust the coupling until optical power fed to one input fibre is equally distributed at the three outputs. A property of this type of coupler is that it provides a phase shift of 120° between the three outputs for optical power applied to any one input. This property is a function of the symmetry of the device, and so it is stable and robust.

When two unmodulated waves of mean power $P_{sig}$ and $P_{LO}$ are input to two of the three input arms, the intensity modulated signals at the three outputs are three signals at the difference frequency $f_{offset}$ mutually phased at intervals of 120°. If now $P_{sig}$ is amplitude modulated (ASK) with a signal of bandwidth B, each of these outputs will be modulated (sampled) by the data signal. With $f_{offset}$ greater than B, the output of each port would be a heterodyne IF ASK signal requiring bandwidth greater than 2B. However, using the coupler the offset frequency can be set within B and signal can still be recovered; as will now be explained.

Figure 2:
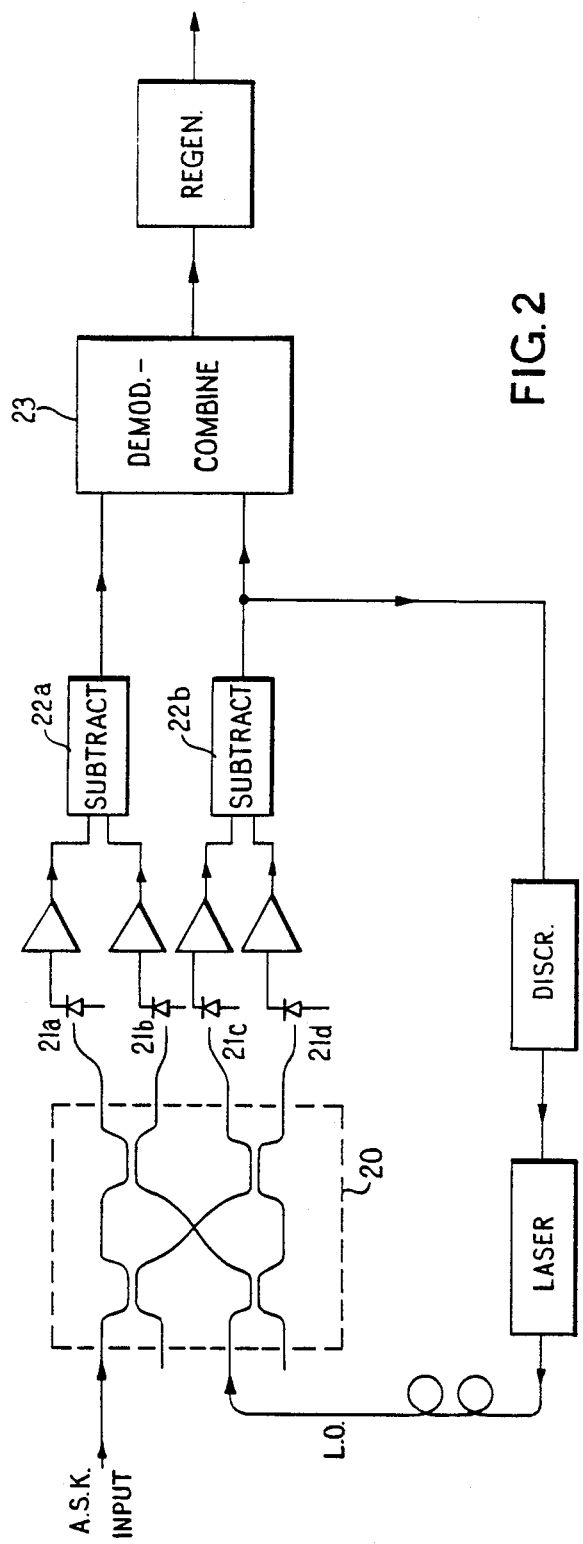
FIG. 2 illustrates an optical receiver for digitally modulated amplitude shift keyed signals employing a 4×4 fibre optic coupler matrix.

With $f_{offset}$ set to some low frequency (of the order of B/10) the output from one channel would appear as a sampled data signal as shown in FIG. 2. This has the disadvantage of varying in amplitude and sign, and of going though zero twice every period. However, with channels mutually phased at 120°, three samples of each data bit are available, of which no more than one can be zero at any time. If the three outputs are appropriately combined, the data can be reconstructed.

Accordingly referring again to FIG. 1, the three outputs of the coupler are fed to individual photodetectors 11a–11c. After conventional amplification the three photodetector outputs are applied to individual envelope detectors 12a–12c and the resulting signals are summed to form the digital output signal.

Receiver bandwidth required is only slightly greater than B, hence PINFET baseband modules can be used. The offset frequency is maintained at a positive value only so that the amplifier chains may be AC coupled. If DC coupling could be employed, $f_{offset}$ could range positive and negative through zero frequency with no penalty. The offset frequency becomes uncritical because the three phase samples give adequate information for demodulation, and frequency stabilization requirements for the LO laser are greatly reduced. These significant advantages are not gained free, but at the expense of receiver sensitivity. An ideal (quadrature) phase insensitive receiver would have the same sensitivity as a heterodyne receiver (3 dB penalty). In this system there is a further 1.8 dB penalty because of the non-ideal phase characteristics of the 3×3 coupler. In exchange for these penalties, one obtains a robust, practical coherent system that only requires baseband receiver modules.

The local oscillator (LO) signal is generated by a laser 13 the frequency of which is controlled by a feedback loop. One of the photodetector channels feeds a filter 14 and a frequency discriminator 15. The discriminator is adjusted to set the laser to the offset frequency required. A temperature compensation control 16 is included to ensure receiver stability. A polarization adjuster 17 is also included in the fibre connection from the laser to the coupler. The amount of frequency offset required in the L.O. signal to allow AC coupling in the amplifiers is small, e.g. 20 Hz, which is very small compared to the optical frequency.

A receiver for ASK signals using a more complex coupler structure to provide quadrature channels for demodulation is shown in FIG. 2. The coupler structure 20 uses four 2×2 couplers to form a 4×4 coupler matrix. The ASK input is applied to one input port of one input coupler and the L.O. signal to the appropriate input port of the other input coupler. The other two input ports are not used. The four output ports are coupled to individual PINFET receiver modules 21a–21d. The electrical outputs from the two receiver modules (21a, 21b and 21c, 21d respectively) connected to each pair of output ports of one output coupler are then substracted one from another (22a, 22b) to provide two quadrature channels for demodulation. This arrangement will balance out any optical L.O. noise. The two channel signals representing in-phase and quadrature information are then combined, e.g. by squaring and adding the signals (23) to give a phase insensitive output. Alternatively, rectifying and adding the quadrature signals will provide slightly better sensitivity but would give a phase dependent ripple on the output.

Figure 3:
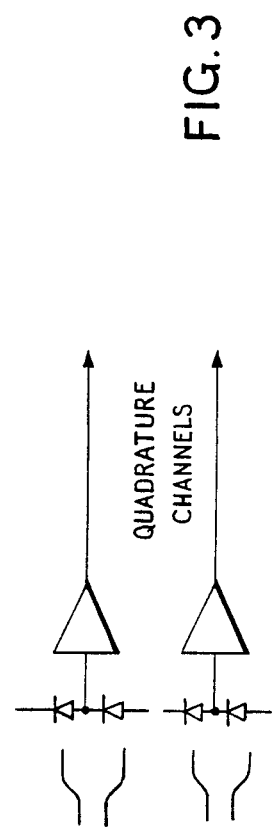
FIG. 3 illustrates an alternative arrangement to that shown in FIG. 2 for obtaining quadrature channel ouputs from the 4×4 coupler matrix.

A modification to the arrangement of FIG. 2 is to use two balanced optical receivers as shown in FIG. 3 in place of the two pairs of receivers of FIG. 2. This would have a sensitivity nearly equal to that of a heterodyne receiver and require a minimum number of electrical components.

Figure 4:
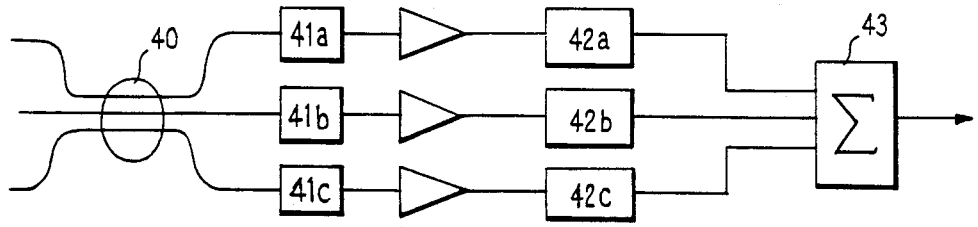
FIG. 4 illustrates an optical receiver for digitally modulated, differentially phase shift keyed signals employing a 3×3 fibre optic coupler.

For differential phase shift keyed (DPSK) signals the arrangements of FIG. 4 can be utilized. The digitally modulated optical signal is applied to one input port of a 3×3 coupler 40 and the L.O. signal is applied to a second port. The third port is not used. The output signals are individually detected (41a–41c) and amplified. Each signal is then individually demodulated (42a–42c) and the three demodulated signals are summed (43). DPSK signals would normally be demodulated as heterodyne signals at an intermediate frequency (IF) greater than the bit rate. Then each IF bit period will contain some cycles of the intermediate frequency, and by using a simple demodulator of the type shown in FIG. 5 the IF carrier of the previous bit period is used as a reference for the demodulation of the current bit. The signal to be demodulated is applied via a direct pat to a multiplier 51, and via a one bit period delay 52 to the multiplier 51. The demodulated bit stream appears at the multiplier output. Because demodulation takes place against a "reference" as contaminated with noise as is the signal, there is a penalty of some 1 dB compared with straightforward PSK, which, however, demands a demodulator phase locked to the sending carrier. With DPSK, carrier locking is not necessary. The input bit stream must however be coded so that a "1" is transmitted by shifting the phase of the carrier by $\pi$ radians relative to the carrier phase in the previous bit period and as a "0" by no phase shift relative to the previous bit period, or by some equivalent strategy.

Figure 5:
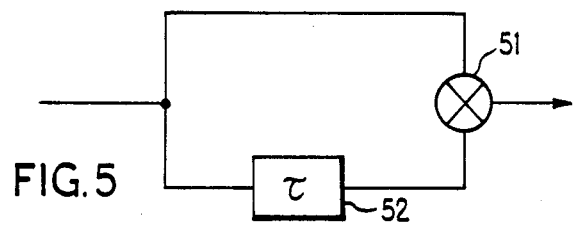
FIG. 5 illustrates a delay line demodulator for use in the receiver of FIG. 4.

With the 3×3 "Homodyne" system of FIG. 4 each bit period will contain only a small fraction of an IF cycle, the IF being typically one fiftieth of the bit rate. However, delay line demodulators as shown in FIG. 5 can be incorporated in each of the three channels and three partial data signals will then be recovered at the channel outputs. It can be shown that the summation of these three partial data streams gives an output which is the desired demodulated data stream.

While we have described above the principles of our invention in connection with specific apparatus, it is to be clearly understood that this description is made only by way of example and not as a limitation to the scope of our invention as set forth in the objects thereof and in the accompanying claims.

We claim:

1. A homodyne optical coherent receiver for modulated optical signals including a multiport optical fibre coupler device having 3 input ports and 3 output ports with energy being coupled from each input port to all the output ports equally, means for applying to one input port a modulated optical signal, means for applying to another input port a local oscillator optical signal of substantially the same optical frequency as the modulated optical signal whereby the output ports of the coupler give separate output signals that are differentially related to the optical phase difference between the modulated input signal and the local oscillator signal, means for individually demodulating the output signals and means for combining the demodulated output signals.

2. A receiver according to claim 1 wherein the demodulating means comprises an envelope detection means for each output signal.

3. A receiver according to claim 1 wherein the demodulating means for each output signal comprises a direct path to which the output signal is applied, said means having a delay equal to one bit period of a digitally modulated input signal, and means for multiplying the delayed signal by the direct path signal.

4. A receiver according to claim 1 wherein the local oscillator signal has an optical frequency offset from the optical frequency of the modulated signal, said frequency offset being less than the bandwidth of the modulation applied to the received optical signal.

* * * * *